(12) United States Patent
Bisztrai et al.

(10) Patent No.: US 11,212,325 B2
(45) Date of Patent: Dec. 28, 2021

(54) COLLABORATIVE BROWSING SERVICE USING A CLOUD-BASED BROWSER

(71) Applicant: LogMeIn, Inc., Boston, MA (US)

(72) Inventors: David Bisztrai, Budapest (HU); Peter Podoski, Budapest (HU); Balint Soveny, Budapest (HU); Robert Juhasz, Budapest (HU)

(73) Assignee: LogMeIn, Inc., Boston, MA (US)

( * ) Notice: Subject to any disclaimer, the term of this patent is extended or adjusted under 35 U.S.C. 154(b) by 0 days.

(21) Appl. No.: 16/561,156

(22) Filed: Sep. 5, 2019

(65) Prior Publication Data

US 2021/0075832 A1    Mar. 11, 2021

(51) Int. Cl.
*H04L 29/06* (2006.01)
*H04L 29/08* (2006.01)

(52) U.S. Cl.
CPC ........ *H04L 65/1069* (2013.01); *H04L 65/403* (2013.01); *H04L 67/02* (2013.01); *H04L 67/10* (2013.01)

(58) Field of Classification Search
CPC ... H04L 65/1069; H04L 65/403; H04L 67/02; H04L 67/10
USPC ......................................................... 709/204
See application file for complete search history.

(56) References Cited

U.S. PATENT DOCUMENTS

| | | | |
|---|---|---|---|
| 5,862,330 A | 1/1999 | Anupam et al. | |
| 8,527,591 B2 | 9/2013 | Pirnazar | |
| 8,539,028 B2 | 9/2013 | Anka | |
| 9,171,087 B2 | 10/2015 | Pirnazar | |
| 9,185,145 B2 | 11/2015 | Pirnazar | |
| 9,483,448 B2 | 11/2016 | Pirnazar | |
| 9,489,353 B2 | 11/2016 | Pirnazar | |
| 10,165,022 B1* | 12/2018 | Hubbard | H04L 65/403 |
| 2002/0032731 A1* | 3/2002 | Qian | G06F 16/954 709/204 |
| 2003/0097448 A1* | 5/2003 | Menezes | H04L 67/02 709/227 |
| 2012/0030288 A1* | 2/2012 | Burckart | G06F 16/954 709/205 |
| 2015/0149916 A1* | 5/2015 | Mendez | G06Q 30/016 715/738 |
| 2017/0185368 A1* | 6/2017 | Handrigan | G06F 16/9577 |
| 2018/0219849 A1* | 8/2018 | Jones | H04L 29/08 |

* cited by examiner

*Primary Examiner* — Glenford J Madamba
(74) *Attorney, Agent, or Firm* — David H. Judson

(57) ABSTRACT

According to this disclosure, an alternative to Document Object Model (DOM)-based co-browsing uses a cloud-based browser that is shared by the participants. The cloud browser enables the participants to view a website together but from within their own respective local browser resource. The cloud-based browser is made available by a service provider. Using a cloud browser and streaming of the website image (from the cloud browser) to both peers guarantees that the participants in the co-browse session see the same image, regardless of the local browsers that they use. Further, by transferring the actual user actions (e.g., clicks, taps, gestures, etc.) and executing them in the cloud browser as if the respective user is present in front of the cloud browser, the approach eliminates dependency on the site/page DOM. Rather, in this approach the cloud browser handles all code injections necessary for the streaming of the images to the endpoints.

15 Claims, 6 Drawing Sheets

COLLABORATIVE BROWSING SERVICE USING A CLOUD-BASED BROWSER

BACKGROUND

Technical Field

This disclosure relates generally to security technologies, products and services.

Background of the Related Art

Remote access technologies, products and systems enable a user of a remote computer to access and control a host computer over a network. Internet-accessible architectures that provide their users with remote access capabilities (e.g., remote control, file transfer, display screen sharing, chat, computer management and the like) also are well-known in the prior art. Typically, these architectures are implemented as a Web- or cloud-based "service." For basic "remote access," an individual who uses the service has a host computer that he or she desires to access from a remote location. Using the LogMeIn software-as-a-service (SaaS), for example, the individual can access his or her host computer using a client computer or mobile device that runs a web browser or a mobile app. Such technologies also are leveraged to facilitate other network-based services, such as remote technical (IT) support, wherein a support technician connects to a local user's computer or mobile device to view, diagnose and fix some (local) technical problem, all from a remote location. LogMeIn Rescue® is a representative service of this type. Remote support tools such as these can successfully help people fix their computer, smartphone and other connected device issues.

It is known in the art to enable multiple end users to access a website at the same time. In these approaches, typically the Document Object Model (DOM) of a website (or web page) is sent from a first user's browser to a second user's web application, where it is re-rendered. A typical use case is a remote technical support scenario, wherein the first user is browsing a website, and the second user is providing technical support. This type of collaborative browsing (also known as co-browsing) is usually achieved with custom code injected into every page of the supported website that sends the DOM to the second user. In operation, the second user's actions are captured as actions on the DOM objects, and these actions are then sent back to the first user's browser. Thus, the approach requires extra implementation and maintenance from the supported website's owner, while also limiting co-browsing to only those pages injected with the custom code. A further problem is that the DOM-based technology is volatile and dependent on the type and version of the browser (as well as the underlying front-end framework), so this type of solution often requires continuous maintenance to keep it up-to-date while also attempting to maintain backwards-compatibility to older browsers. These known approaches also do not necessarily yield the same visual image and behavior in different browsers, causing the respective collaborators to see different things.

There remains a need to address these and other deficiencies of existing collaborative browsing techniques, products and services.

BRIEF SUMMARY

According to this disclosure, an alternative to DOM-based co-browsing uses a cloud-based browser that is shared by the participants. The cloud browser enables the participants to view a website together but from within their own respective local browser resources. The cloud-based browser is made available by a service provider, and interactions with a website of interest are captured by the cloud browser and streamed (as an image) to each of the respective endpoint browsers. Using a cloud browser, and the streaming of the website image (from the cloud browser) to both peers, guarantees that the participants in the co-browse session see the same image, regardless of the local browsers that they use. Further, by transferring the actual user actions (e.g., clicks, taps, gestures, etc.) and executing them in the cloud browser as if the respective user is present in front of the cloud browser, the approach eliminates dependency on the site/page DOM. Rather, in this approach the cloud browser handles all code injections necessary for the streaming.

Preferably, the cloud browser need not access the supported website or the Internet directly (except for the co-browse's sessions connection traffic and image streaming), but rather does so through a proxy tunnel that is instantiated in the web application on the customer's side of the connection. In this way, when the cloud browser loads the supported website, the page request is sent to the supported web server from the customer's browser, sending all of the customer's relevant cookies, etc., as if the site was being browsed locally in the customer's browser. This approach ensures that the user login-session is retained, so that there is no need for any subsequent login (to facilitate the co-browsing session). Further, the tunneling approach ensures that there is no change in the supported website's understanding/perception of the customer's geo-location. An alternative to tunneling is for the cloud browser service provider to programmatically receive a short-lived token (e.g., from an authenticated customer) so that the service provider can log the end-user in on the cloud browser and retain his or her then-active web session.

A further advantage of this approach is that, unlike the prior art, the co-browsing session is not limited to the supported website; the users can navigate the cloud browser to any website.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION OF AN ILLUSTRATIVE EMBODIMENT

As used herein, the following terms have the following meaning:

"agent"—is a co-browse user, e.g., one who provides assistance to customers via co-browse sessions;

"agent application"—is a web application that runs on an agent's computer or other mobile device, typically in a supported web browser (e.g., Chrome, Firefox, Safari, etc.) and connects to the co-browse service, and that enables an agent to conduct a co-browse session as well as to provide various account management, service management and reporting functions;

"customer"—is a person (end user) receiving support from the agent via a co-browse session;

"customer application"—is a web application that runs in any browser or other app on the customer's computer or mobile device and that connects to a co-browse session;

"co-browse session"—is a collaborative session in which the agent and the customer control the same browsing session;

"co-browse service" is a network-accessible service, typically provided by a set of load-balanced, globally-distributed servers providing secure access for the agent and the customer applications, preferably through encrypted websocket connection and an Application Programming Interface (API) call;

"enterprise" or "company" is a third party that employs a customer, and an enterprise may have the ability to manage the customer's identity (e.g., via single sign-on (SSO), an identity management service, etc.).

In a typical use case, the customer is browsing on a website and needs some help to take a desired action. He or she calls the website's customer support for help, opens up a chat session, or the like. The agent answering the call desires to view the page the customer is viewing. A co-browse session is initiated. The above workflow is conventional. In contrast to the known techniques, which are DOM-based, in the approach herein, the participants contain operating their respective local-to-them browser but (under the covers) remotely control the same virtual browser, and that browser is executes in the cloud. Before describing this operation/workflow in further detail, the following provides background for a service provider infrastructure that may be used to support this functionality.

Figure 1:
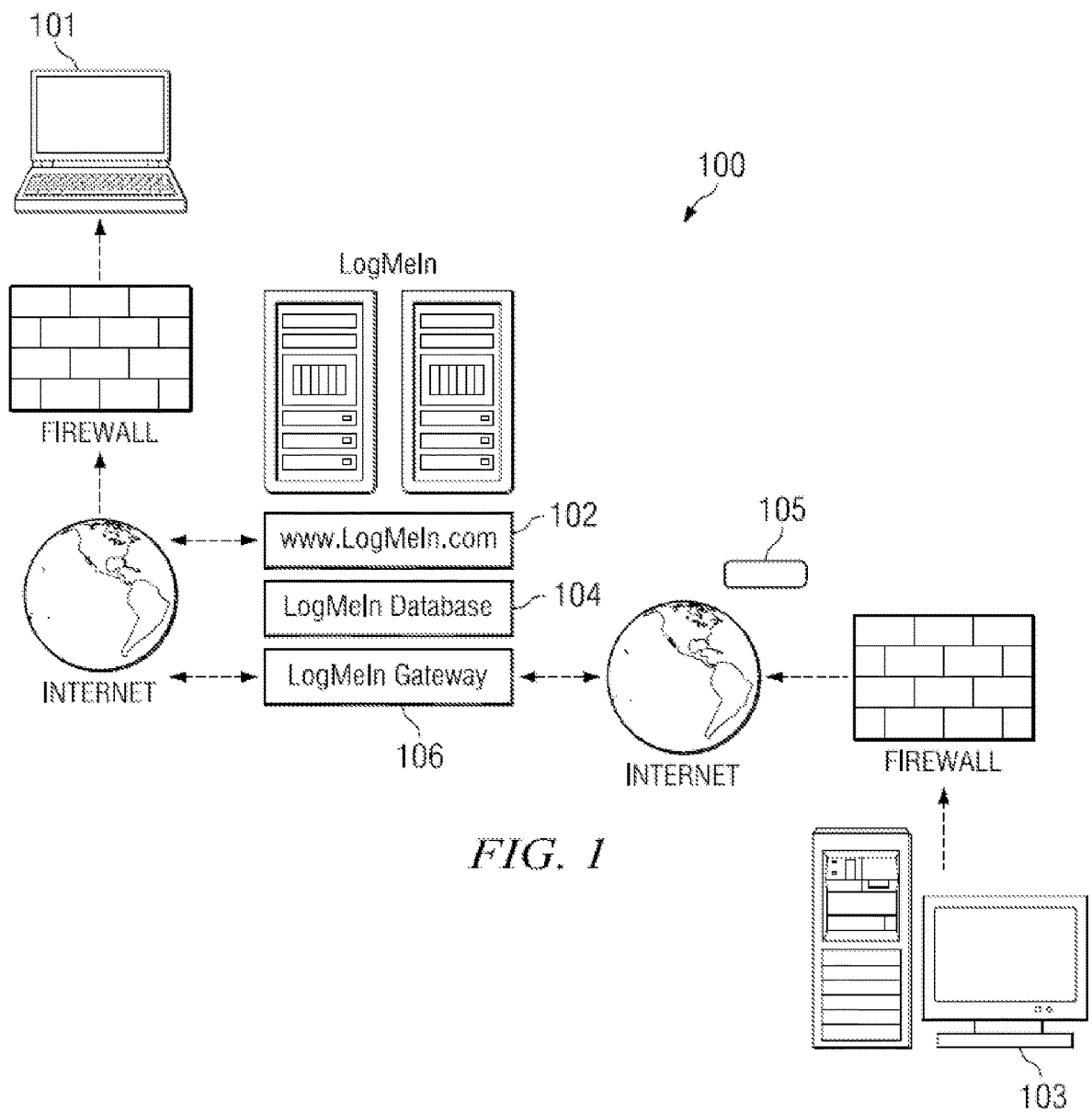
FIG. 1 depicts a service provider infrastructure in which the cloud browser-based co-browsing techniques of this disclosure may be carried out.

In particular, FIG. 1 illustrates a high level view of an on-demand remote support architecture 100 in which the disclosed cloud browser-based co-browsing technique may be practiced. This architecture is merely representative, and it should not be taken as limiting. Preferably, the architecture comprises "n-tiers" that include a web server tier 102, a database tier 104, and a gateway tier 106. The web server tier 102 comprises a plurality of machines that each executes web server software. The web server tier provides an Internet-accessible web site. Preferably, the web site associated with a site domain (however designated) is available from multiple locations that collectively comprise the web server tier 102. The database tier 104 comprises a plurality of machines that each executes database server software. The database tier provides a network-accessible data storage service for generating and storing data associated with end user sessions to the remote access service. The gateway tier 106 comprises a plurality of machines that each executes application server software. The gateway tier provides a network-accessible connection service for establishing and maintaining connections between and among the participating end user computers. Although not shown, preferably end user computers connect to the gateway servers over secure connections, e.g., over SSL, TLS, or the like. A representative machine on which the web server, database server or gateway server executes comprises commodity hardware (e.g., one or more processors) running an operating system kernel, applications, and utilities.

Generalizing, one or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

As additional background, it is well-known that web applications—especially those supported in the cloud—increasingly are becoming more dependent on federated computing environments, as well as out-of-band authentication. In a "federation," entities cooperate such that users in one entity leverage relationships with a set of entities through an entity's participation in the federation. Users can be granted access to resources at any of the federated entities as if they had a direct relationship with each one. Users are not required to register at each entity and are not required to identify and authenticate themselves. More formally, a federation is a set of distinct entities (enterprises, logical units within an enterprise, etc.) that cooperate to provide a single-sign-on experience to a user. This type of environment differs from a typical single-sign-on (SSO) environment in that two entities do not need to have a direct, pre-established, relationship defining how and what information to transfer about a user. Within a federated environment, entities provide services that deal with authenticating users, accepting authentication assertions (e.g., authentication tokens) that are presented by other entities, and translating the identity of the vouched-for user into one that is understood within the local entity. Federation reduces costs and administrative burdens on a service provider, who relies on trusting the federation itself instead of managing authentication information.

In a typical operation, a federated environment allows a user to authenticate at a first entity. The first entity provides the user with an authentication "assertion" about the user for use at a second entity. The user can then access protected resources at a second, distinct entity, by simply presenting the authentication assertion that was issued by the first entity. The user does not have to authenticate again at the second entity, but simply passes-in the assertion obtained from the first party.

Specific entities can take on specific roles in the context of a federated environment. An identity provider (IdP) is a specific type of service that provides identity information as a service to other entities within the federation. Typically, the entity that issues assertions is the IdP; once a user obtains an assertion by authenticating to the IdP, the other entities in the federation are service providers for the duration of the particular federated session or transaction. The Security Assertion Markup Language (SAML) is an XML-based standard for exchanging authentication and authorization data between security domains, such as between an identity provider and a service provider. SAML assumes that a principal (often a user) has enrolled with at least one identity provider, which provides local authentication services to the principal. A service provider relies on the identity provider to identify the principal. At the principal's request, the identity provider passes a SAML assertion to the service provider. On the basis of this assertion, the service provider (SP) makes an access control decision.

By way of additional background, Cross-origin resource sharing (CORS) is a mechanism that allows restricted resources on a web page to be requested from another domain outside the domain from which the resource originated. CORS defines a way in which a browser and server can interact to determine safely whether or not to allow the cross-origin request. Under the CORS standard, HTTP headers provide browsers and servers a way to request remote URLs only when they have permission. Although some validation and authorization can be performed by the server, it is generally the browser's responsibility to support these headers and respect the restrictions they impose.

Figure 2:
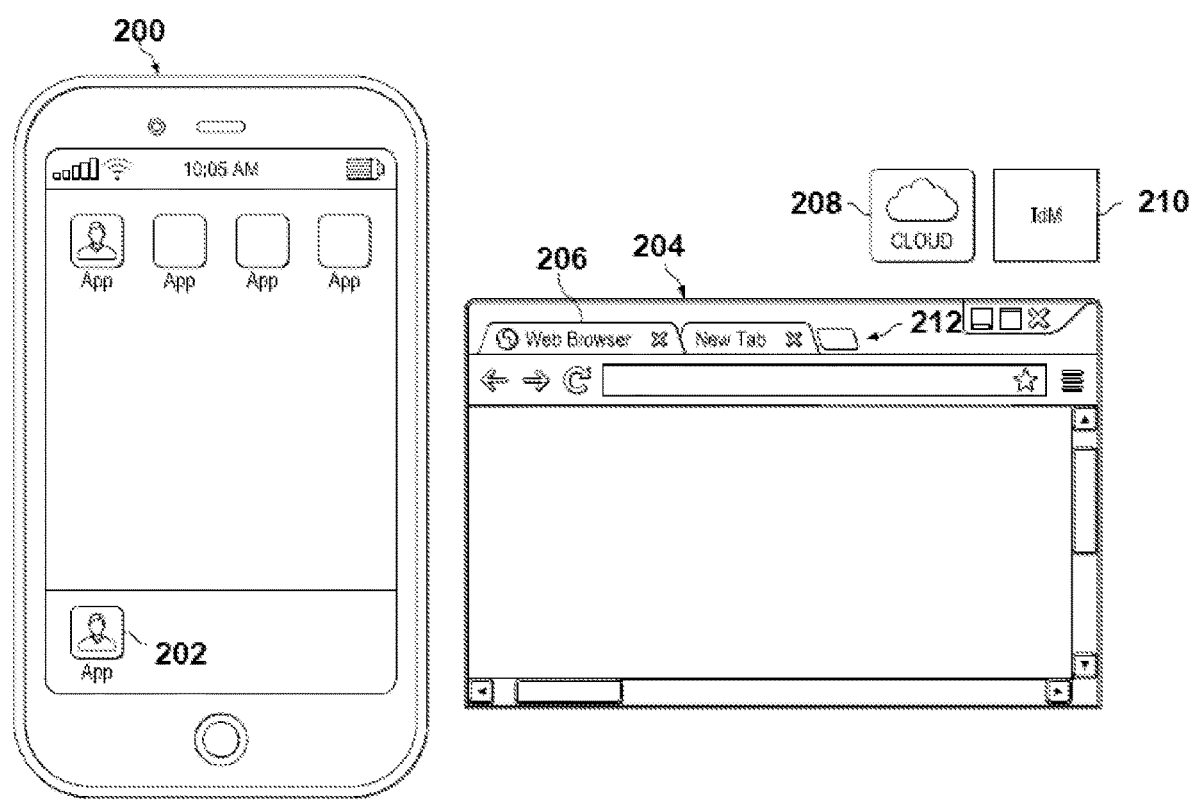
FIG. 2 depicts representative endpoints that collaborate in a co-browsing web session according to the technique herein.

Referring now to FIG. 2, and by way of further background, the technique of this disclosure typically involves a set of computing elements: an end user mobile or tablet device 200 running a mobile app 202, a computing entity 204 running a web browser 206, and a cloud service 208 having an identity manager 210. The identity manager 210 includes a data repository, e.g., that stores identity or other related information. As also depicted in FIG. 2, web browser 206 may include a browser plug-in 212 that facilitates various operations described below. Although a browser plug-in 212 is a preferred implementation, the functions of this plug-in may also be implemented in other ways, e.g., an applet, an ActiveX control, JavaScript, native code, or the like. In one non-limiting embodiment, the cloud service 208 is implemented in associated with a remote access architecture, such as LogMeIn®. In one embodiment, the computing entity 204 is associated with a remote support technician, and the mobile device 200 is associated with a user seeking to obtain remote support from that technician with respect to a website or page. Although not depicted, the end user seeking technical support operates a desktop, laptop or other conventional computing system that includes a web browser.

Cloud Browser-Based Co-Browsing

With the above as background, the following describes a preferred co-browsing approach of this disclosure. As described above, the approach herein provides an alternative to DOM-based co-browsing through use of a cloud-based browser that is shared by the participants, and that the participants view and control together. As noted above, in a preferred embodiment the cloud-based browser is made available by a service provider, such as via the infrastructure shown in FIG. 1. Using a cloud browser and streaming of the website image (from the cloud browser) to both endpoints (sometimes referred to herein as peers) guarantees that the participants in the co-browse session see the same image (namely, the one rendered in the cloud browser), regardless of the local browsers that they use. Further, by transferring the actual user actions (e.g., clicks, taps, gestures, etc.) and executing them in the cloud browser as if the respective user is present in front of the cloud browser, the approach eliminates dependency on the site/page DOM. Rather, in this approach the cloud browser handles all code injections necessary for the streaming.

In operation, the cloud browser interacts with the website of interest to actually "browse" the site, and a co-browse application script is executed in each endpoint to create a "shell" window (in the respective local browser) in which one or more images (of the website of interest) captured by the cloud browser are then rendered locally at the respective endpoints. The image(s) in effect are drawn over whatever content is otherwise present in the local browser, and thus both participants in effect view the same image. During the co-browse session, preferably visual cues and other controls (e.g. masking of sensitive content) is also enabled to increase the customer's trust in the security of the interaction with the agent.

Figure 3:
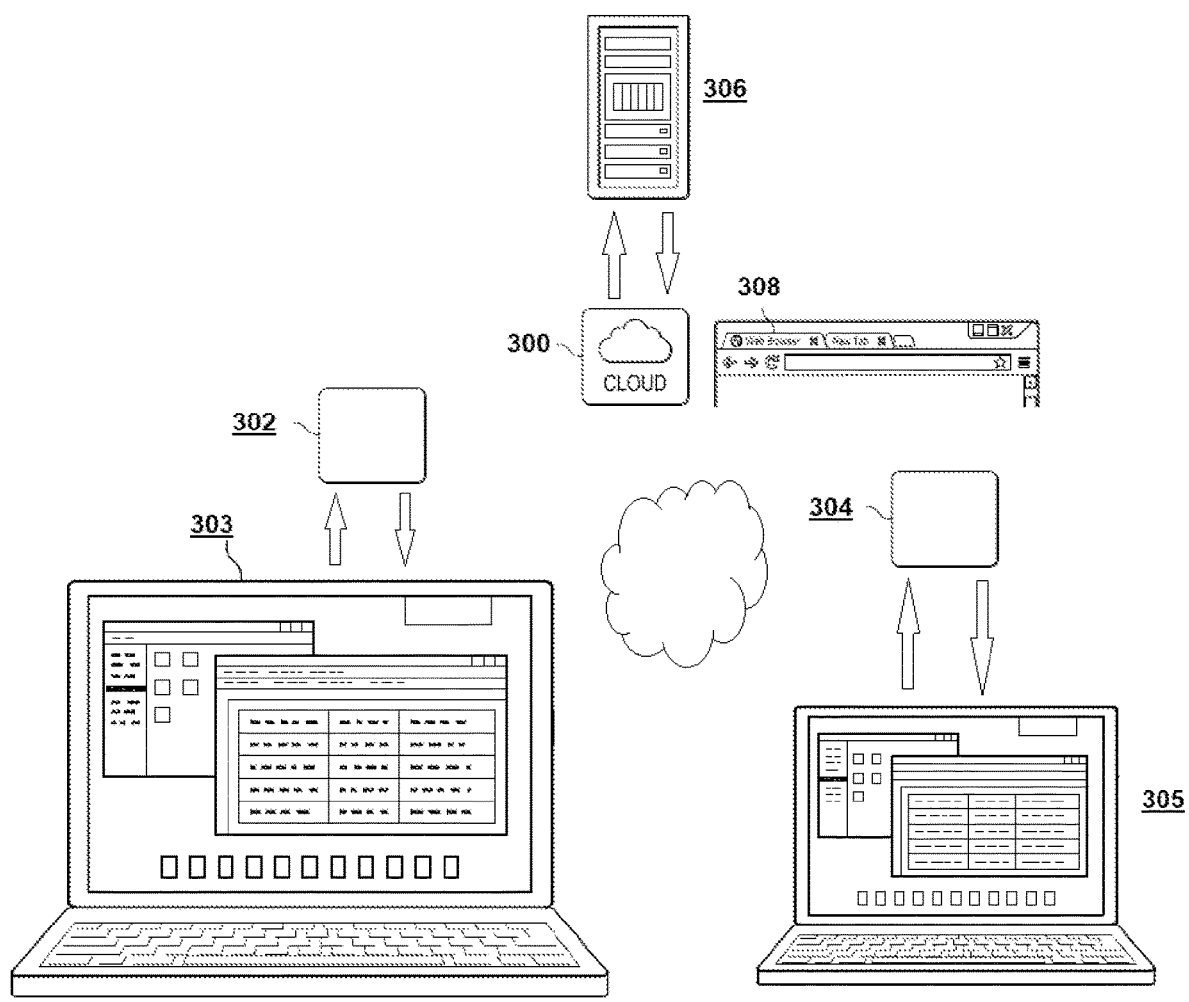
FIG. 3 depicts a typical co-browsing session in association with an end user seeking to obtain assistance from a source of on-line support.

With reference now to FIG. 3, the basic workflow of one embodiment is depicted. As shown, the service provider infrastructure 300 operates (or has associated therewith) a user identity and co-browse service 302, as well as a customer application 304 (e.g., a remote support application that is actually provided by the service provider under-the-covers). It is not required that the same service provider 300 operate all of these services, and it is not required that the user identity service be operated together with the co-browse service. Indeed, one or more of these service(s) may be managed or provided by third party entities (e.g., an identity provider (IdP) that provides identity management services). In this example, a customer 305 operating a laptop or mobile device desires to access and navigate a supported website 306. Before, during or after such access, it is assumed that the customer desires to obtain some form of technical support with respect to the supported website. To this end, the customer accesses the remote support service (e.g., via a link, a telephone call, etc.) and is connected (via that support service) to an agent 303. The agent typically operates a workstation. Both the agent and the customer machines or devices have an associated web browser as depicted.

According to this disclosure, the cloud service 300 operates a cloud-based browser 308. Preferably, the browser 308 is a headless browser (e.g., CasperJS, PhantomJS, Selenium, or the like), although a conventional browser (e.g., Google Chrome, Mozilla Firefox) may be used. In this example scenario, both the agent 303 and the customer application 304 are web applications running in the users' browser of choice. As depicted in FIG. 3, the back-end computing systems serving these applications typically are hosted in the cloud, providing the peers (namely, the agent 303 and the customer 305 with the means to connect with one another in a co-browsing session. Once a co-browse session is established between the customer 305 and the agent 303, the supported website 306 is loaded in the isolated headless browser 308 in the cloud (the "cloud browser"). Preferably, there is a given headless browser instance executing in the cloud for each co-browse session, and thus the service provide operates the necessary machines (physical or virtual), operating systems, applications, data stores, etc. to support such infrastructure. Preferably, the headless browsers execute in one or more application servers in the infrastructure, and these machines may execute in a private network or are otherwise inaccessible via the publicly-routable Internet. Once connected, the actual web browsing by the agent and/or the customer, and all communication with the supported website, takes place in the cloud browser 308. In particular, the image is streamed to both users' web applications, and the user actions are sent back to be performed in the cloud browser.

In one embodiment, no technical changes are required from the customer. This is sometimes referred to herein as a codeless version. In another embodiment (the code version), a line of JavaScript code is added to the supported website 306. For the codeless version, the customer 305 simply opens up a co-browse URL to start a session with the agent 303. For the code version, there is no need to navigate to a specific URL to start co-browsing. In this alternative embodiment, the supported website 306 adds a button or link on the website as the entry point for the co-browse session; when instructed by the agent 303 the customer 305 clicks on the specified co-browse button to start a session within the same browser tab in which he or she is previously browsing.

Preferably, the cloud browser 308 handles all code injections necessary for the streaming (on the one hand between the cloud browser and the agent's web application, and on the other hand between the cloud browser and the customer's web application), all preferably without any implementation of maintenance cost from the supported website owner.

Remote-control and co-browse rely on the customer's trust in the agent and the tool(s) that the agent uses. Preferably, agents are tied to company accounts and are required to log in using at least username and password, and/or together with more fine-grained authentication (e.g., biometric). Thus, as an optional additional security step, the account administrator sets up mandatory two-factor authentication for all the agent in the account. An agent console can then only be accessed after successful authentication. Additional services (such as reporting, recordings, account administration, etc.) for authenticated agents or administrators can be controlled and limited by role-based access control mechanisms. To protect the customer, preferably informative labels are rendered throughout the co-browsing session so that the customer is aware of the agent's access during the browsing session. Preferably, an "end session" button is displayed so that the customer can end the co-browse session anytime. Preferably, the co-browse service is offered at a custom URL subdomain of the customer-facing co-browse page. For additional protection, the agent is required to ask for explicit customer permission to control the browsing session, and without which the agent can only view the session and guide the customer.

Transport protection is also implemented. In particular, preferably the customer endpoint and backend communication is encrypted using latest-version TLS (e.g., OpenSSL). Communications security controls based on strong cryptography are implemented on the TCP layer via TLS-standard solutions. Using strong authentication measures, there is a reduced likelihood of would-be attackers masquerading as infrastructure services or inserting themselves in the middle of support session communications. To provide protect against eavesdropping, modification or replay attacks, preferably IETF-standing TLS protocols are used to protect all communication between endpoint and the co-browse and related services. Representative ciphers are TLS 1.2, 2048-bit RSA, AES-256 strong encryption ciphers, and 384-bit SHA-2. Inbound connections also use TLS cipher suites, and agent browsers preferably are configured using strong cryptography.

When connections are established to the co-browse website 302 and between the co-browse components (as depicted in FIG. 3 and described above), preferably the infrastructure servers authenticate themselves to client using public key certificates. For added protection against infrastructure attacks, mutual certificate-based authentication preferably is used on all server-to-server communication. Preferably, all server-to-server APIs are accessible only within the provider's private network and behind robust firewalls. For data protection, preferably the service components are hosted in highly secure and reliable data centers in multiple regions. Data centers are compliant to ISO-27001, SOC-2 and SOC 3 standards.

Preferably, a cloud browser instance (associated with a co-browse) is completely isolated from any other instance and is purged after the co-browsing session has ended to protect and erase the customer's personal information and login session.

Figure 4:
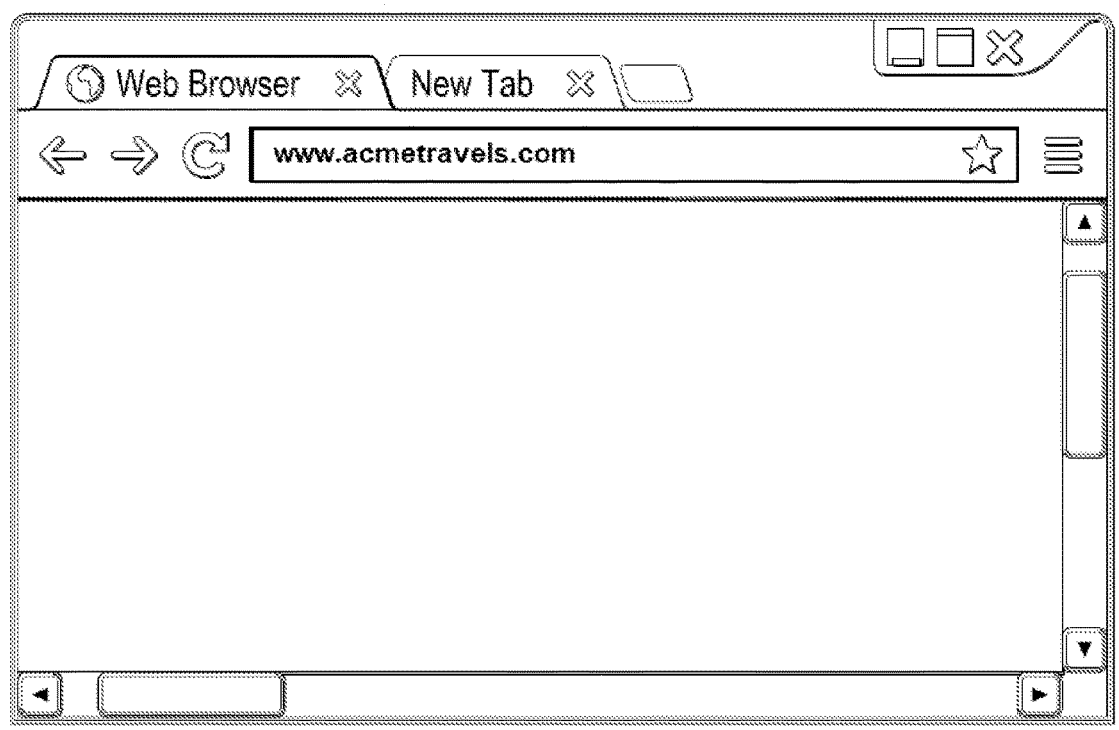
FIGS. 4-9 depict representative customer and agent screen displays before, during and after a co-browse session according to this disclosure
Figure 5:
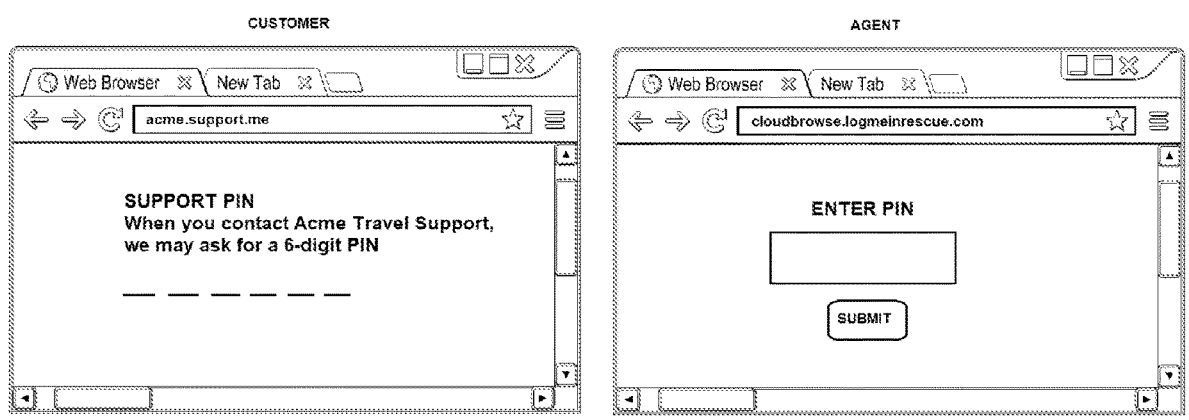
Figure 6:
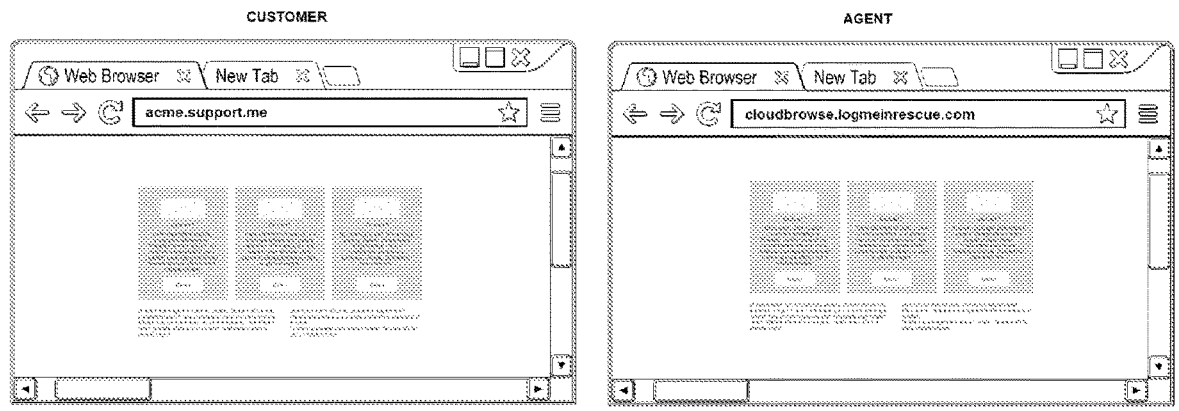
Figure 7:
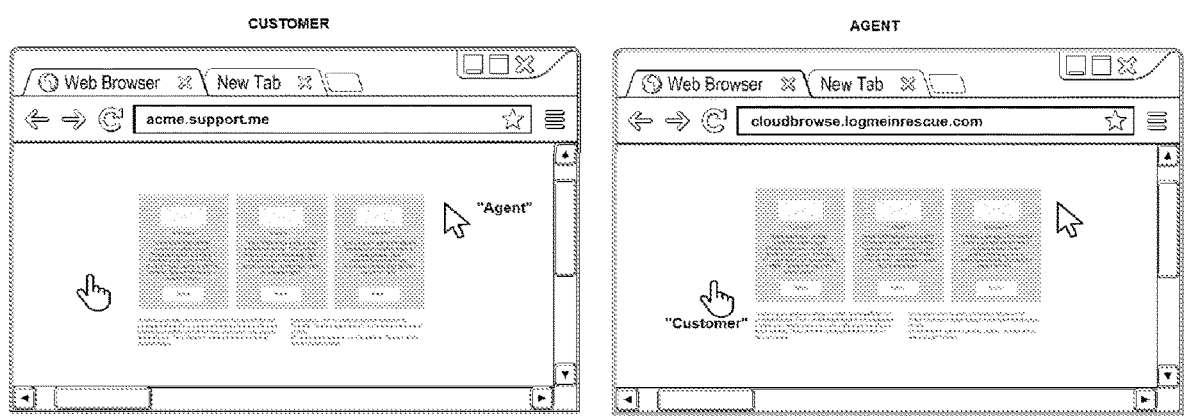
Figure 8:
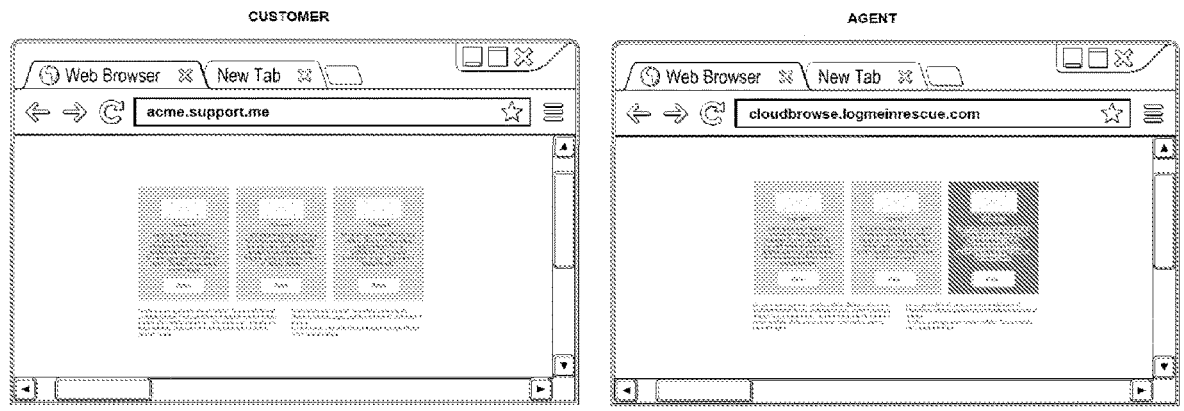
Figure 9:
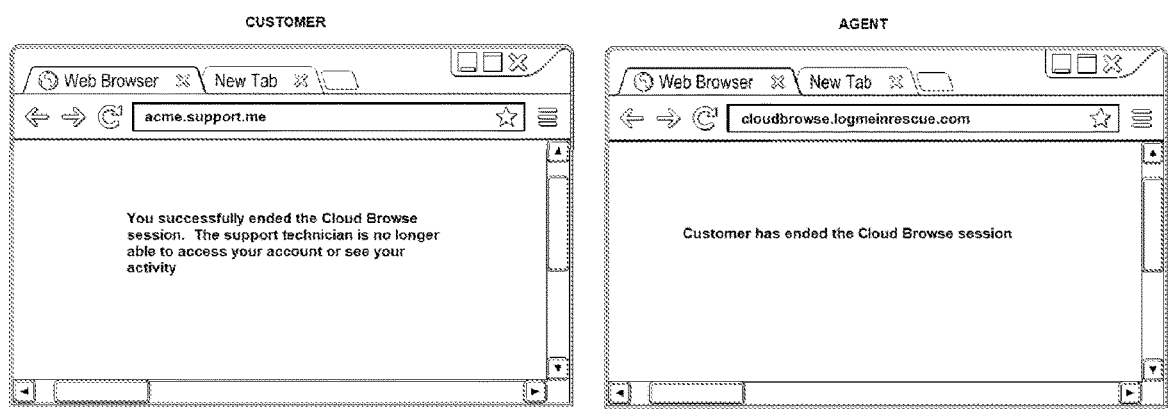

A typical use case is now described. While browsing on Acme Travels website, assume the customer Helen needs help to take the desired action on the site. She calls Acme Customer Support for help. The agent (Brian) answering the phone is not sure which page the customer is viewing, and at this point Brian recognizes he can help the customer more effectively by looking at her screen. The agent then asks if the customer is willing to share her screen to receive visual assistance. The customer agrees to share the website she is on. FIG. 4 depicts the supported website page. The agent then asks the customer (e.g. over the phone) to navigate to a support site (e.g., FIG. 3, 304), such as acme.support.me. As depicted in FIG. 5, the agent explains that the customer should then be able to see a PIN code that she needs to share with the agent in order to start co-browsing. The agent further explains that once the customer shares the code, the code disappears, and the agent will also see the page. FIG. 6 depicts that both the customer and the agent now "see" the same page, even though in both cases that page is actually being browsed by the headless cloud browser and simply streamed to each of the participants. FIG. 7 depicts the co-browsing, with both participants seeing two mouse cursors. Preferably, the cursor of the other party is labeled (e.g., the customer sees a second cursor with the "agent" (or the agent's name) label. If the customer was browsing and needs help on an authenticated page, she logs in again. This step can be omitted. During the session both participants can navigate the website (e.g., click and scroll), and preferably the agent can also draw with a pen to highlight parts of the screen for the customer. Preferably, and as depicted in FIG. 8, data masking is implemented so that the agent cannot see sensitive customer data. The customer can end the session anytime using the Stop button on her screen. If the support session is finished the agent also can end the co-browse session. FIG. 9 depicts the respective customer and agent confirmation screens after the sharing has ended. Although not depicted, the customer may be afforded an opportunity to take a survey, after which she can then navigate back to the tab at which the co-browse session ended.

Throughout the co-browse session, the images rendered in the respective local browsers are actually those obtained by the cloud browser and streamed back to the respective endpoints. Each endpoint also receives information for any respective overlay, e.g., labeling. masking, etc.

In an alternative embodiment, the cloud browser 308 need not access the supported website 306 or the Internet directly (except for the co-browse's sessions connection traffic and image streaming), but rather it does so through a proxy tunnel 310 that is instantiated in the web application 304 on the customer's side of the connection. In this way, when the cloud browser 308 loads the supported website 306, the page request is sent to the supported web server from the customer's browser, sending all of the customer's relevant cookies, etc., as if the site was being browsed locally in the customer's browser. This alternative workflow provides advantages, because it insures that the user login-session is retained, so that there is no need for any subsequent login by the customer (to facilitate or continue with the co-browsing session). Further, the tunneling approach of this alternative embodiment insures that there is no change in the supported website's understanding/perception of the customer's geolocation.

A still further alternative to tunneling is for the cloud browser service provider 300 to programmatically receive a short-lived token (e.g., from an authenticated customer of an enterprise) so that the service provider can log the end-user in on the cloud browser and retain his or her then-active web session. In a representative scenario, a user seeking support is logged into an enterprise website, and the support agent may be employed by the enterprise (or by some other entity on behalf of the enterprise). In this scenario, the enterprise provides an API and a token to the service provider so that the provider can log in the user (seeking support) in the cloud browser's web session.

In one non-limiting embodiment, the cloud service 108 is implemented in associated with a remote access architecture, such as LogMeIn® leveraging image-stream based remote support technologies.

Image streaming (from the cloud browser to the client browsers) may be implemented as a sequence of still images on a WebSocket connection, in effect as keyframes (I-frames) of a video. An alternative is to use the WebRTC protocol and stream real-time video from the cloud browser to the clients. Still another alternative is to stream (to each client local browser) the cloud browser's internal composition layers and then have the respective local browser composite the final image (for local display); in this approach the cloud browser only sends those image regions down the wire that have actually changed, and the local user can scroll the page freely without necessarily having to re-render the image in the cloud. One other alternative is to obtain the DOM from the cloud browser and send it to each client, in which case the respective local browser's engine would then render the image; this approach involves using the DOM (not as in the prior art but) merely as a presentation layer, and any local actions would not mutate the DOM but instead would be sent directly to the cloud browser, which in turn re-renders the DOM and sends it back down to the clients to update their screens.

The technique herein provides significant advantages. By using sandboxed browser(s) hosted in the cloud for the actual browsing of a website and transfer of an image stream to both the technician and the supported user, both end users see the very same image stream in their own browsers, and all their local actions (e.g., gestures, taps, keystrokes, clicks, etc.) are transferred to the cloud browser, which then executes those actions as if there were done locally. As an optimization, the approach enables all Internet traffic to be proxied through the supported user's browser, so that the website in the cloud browser behaves as if running on the supported user's local device (with respect to cookies, login, and other locally-stored user data).

Additional Enabling Technologies

A mobile device comprises a CPU (central processing unit), computer memory, such as RAM, and a drive. The device software includes an operating system (e.g., Apple iOS, Google® Android™, or the like), and generic support applications and utilities. The device may also include a graphics processing unit (GPU). It also includes a touch-sensing device or interface configured to receive input from a user's touch and to send this information to processor. The touch-sensing device typically is a touch screen. The touch-sensing device or interface recognizes touches, as well as the position, motion and magnitude of touches on a touch sensitive surface (gestures). The device typically also comprises a high-resolution camera for capturing images (e.g., QR codes), an accelerometer, a gyroscope, and the like.

Any push notification implemented in the co-browse or related services may be provided to the mobile device in any convenient manner, e.g., Apple Push Notification (APN) Service (APN), Google push notification services (for iOS or Android), or the like.

A mobile device may use an authenticator app such as the LastPass® mobile password manager authenticator app (or equivalent).

Information logged about the co-browse session is securely stored in the cloud service using a secure repository.

In one embodiment, a cloud service provider provides the cloud service, the remote support web application (executed by the agent), and any necessary identity management service or support.

In another embodiment, the cloud service provider provides the cloud service while other entities provide the remote support web application and/or identity service.

The cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the cloud service comprises a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The computing entity on which the browser and its associated browser plug-in run may be any network-accessible computing entity that is other than the mobile device that runs the authenticator app itself. Representative entities include laptops, desktops, workstations, Web-connected appliances, other mobile devices or machines associated with such other mobile devices, and the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The described commercial products, systems and services are provided for illustrative purposes only and are not intended to limit the scope of this disclosure.

The techniques herein provide for improvements to technology or technical field, as well as improvements to various technologies, all as described.

Having described our invention, what is claimed is as follows.

The invention claimed is:

1. A method to provide support with respect to a website of interest, comprising:
responsive to receipt from a first user of a request for support, selectively initiating a co-browsing session between the first user and a second user, each of the first and second users having a local browser configured to browse the website of interest;
configuring an instance of a network-accessible browser that is distinct from and executes independently of the local browser of each of the first and second users;
responsive to an interaction between the network-accessible browser and the website of interest, capturing the website and streaming the captured website to each of the first and second user's local browser as one of: a sequence of still images in a WebSocket connection, a real-time video over WebRTC, and a stream of internal composition layers of the network-accessible browser and associated image region changes; and
responsive to completion or termination of the co-browsing session, purging the instance of the network-accessible browser.

2. The method as described in claim 1 further including receiving at the network-accessible browser data indicative of a user action at a respective one of the first or second user's local browser.

3. The method as described in claim 2 further including executing the user action in the network-accessible browser by forwarding the data to the website of interest.

4. The method as described in claim 1 further including providing to a respective user's local browser additional information.

5. The method as described in claim 4 wherein the additional information is a label identifying a respective user's access to the co-browsing session.

6. The method as described in claim 4 wherein the additional information is a mask that obscures given content on a respective user's display.

7. The method as described in claim 1 wherein the co-browsing session is terminated in response to a respective user taking an action to stop the co-browsing session.

8. The method as described in claim 1 wherein the first and second users execute a web application in their respective local browser.

9. The method as described in claim 1 wherein the second user is a technical support agent.

10. The method as described in claim 1 wherein the co-browse session is initiated from within a technical support session.

11. The method as described in claim 1 wherein the network-accessible browser is a headless browser hosted in a cloud.

12. The method as described in claim 1 further including proxying first user login information from the network-accessible browser to the website during the co-browse session.

13. The method as described in claim 1 further including programmatically receiving a token, and using the token during the co-browse session to maintain the first user logged into the website via the network-accessible browser.

14. Software-as-a-service infrastructure, comprising:
a data center hosting cloud hardware and software;
a co-browse service comprising an application executing in the cloud hardware and software, the application configured in response to a request for a co-browse session to launch a cloud browser, to use the cloud browser to interact with a website, to capture one or more interactions between the cloud browser and the website, and to stream the website to first and second endpoints as one of: a sequence of still images in a WebSocket connection, a real-time video over WebRTC, and a stream of internal composition layers of the network-accessible browser and associated image region changes, wherein each endpoint includes a local browser;
wherein the local browser of each endpoint is distinct from and executes independently of the cloud browser; and
wherein, responsive to completion or termination of the co-browse session, the cloud browser is closed.

15. The infrastructure as described in claim 14 wherein the cloud browser is a headless browser.

* * * * *